United States Patent [19]

Nakai et al.

[11] Patent Number: 5,250,590

[45] Date of Patent: Oct. 5, 1993

[54] FLAME RETARDANT RESIN COMPOSITION

[75] Inventors: Fumio Nakai, Kurita; Hidetaka Matsuzaki, Settsu; Koji Matsumoto, Ibaraki; Ichiro Kondou, Amagasaki, all of Japan

[73] Assignee: Sumitomo Naugatuck Co., Ltd., Japan

[21] Appl. No.: 775,972

[22] PCT Filed: Mar. 12, 1991

[86] PCT No.: PCT/JP91/00332

§ 371 Date: Nov. 5, 1991

§ 102(e) Date: Nov. 5, 1991

[87] PCT Pub. No.: WO91/13937

PCT Pub. Date: Sep. 19, 1991

[30] Foreign Application Priority Data

Mar. 12, 1990 [JP] Japan .................... 2-62164

[51] Int. Cl.$^5$ .................... C08K 5/06; C08K 3/22; C08L 69/00; C08L 55/02

[52] U.S. Cl. .................... 523/435; 524/109; 524/114; 524/339; 524/373; 524/409; 525/65; 525/67; 525/463

[58] Field of Search .............. 523/435; 524/109, 114, 524/339, 373, 409; 525/65, 67, 463

[56] References Cited

U.S. PATENT DOCUMENTS

4,879,329  11/1989  Hongo et al. .................... 524/114

FOREIGN PATENT DOCUMENTS

2375312  7/1978  France .
61-211354  9/1986  Japan .
240571  9/1988  Japan .................... 525/373
64-22958  1/1989  Japan .

OTHER PUBLICATIONS

Chemical Abstracts 115:209453n (1991).

*Primary Examiner*—David J. Buttner

[57] ABSTRACT

A flame retardant resin composition comprising (A) 70 to 10% by weight of a rubber-reinforced styrene base resin, (B) 20 to 85% by weight of a polycarbonate resin, (C) 5 to 35% by weight of a high molecular weight halogen-containing compound of the formula:

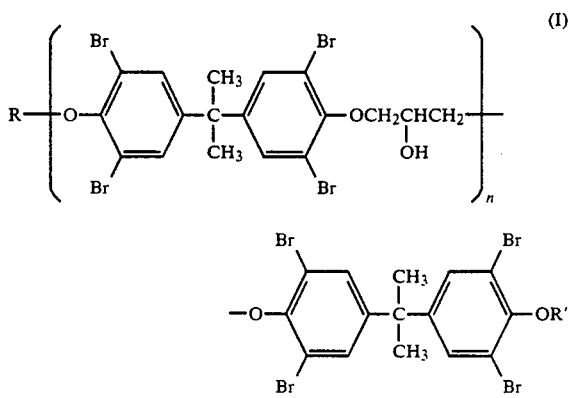

wherein n is an average polymerization degree and an integer of 4 to 30, R and R' are independently a hydrogen atom, a methyl group, an epoxypropyl group, a phenyl group, a halogenated phenyl group or a group of the formula:

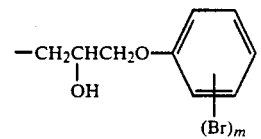

wherein m is an integer of 0 to 3, which compound has a bromine content of at least 45% by weight and an epoxy equivalent of at least 10,000 g/mol, and (D) 0 to 10% by weight of an antimony compound, which resin composition is excellent not only in heat stability but also in heat resistance, impact resistance, processability and light resistance.

1 Claim, No Drawings

FLAME RETARDANT RESIN COMPOSITION

FIELD OF THE INVENTION

The present invention relates to a flame retardant resin composition with good heat stability, which comprises a rubber-reinforced thermoplastic resin, a polycarbonate resin and a halogen-containing compound having a specific chemical structure.

DESCRIPTION OF THE PRIOR ART

A resin composition comprising a rubber-reinforced styrene base resin, typically an ABS resin and an AES resin, and a polycarbonate resin is widely used as a material having good heat resistance and impact resistance. However, since such resin composition is an inflammable material, it has some limitation when it is used in electrical or electronic equipments which should have flame retardancy, for example, a self-extinguishing property (V-0, V-1 and V-2 classes) according to the United States Underwriters Laboratories (UL) Standard 94.

To impart flame retardancy, there is used a halogen-containing compound such as tetrabromobisphenol A (TBA) and decabromodiphenyl ether (DBDE) or a combination of the halogen-containing compound with an antimony compound. Though the resin composition can be made flame retardant by the addition of such compound, there arises some problems that heat resistance and impact resistance which are characteristic features of the resin composition are significantly deteriorated.

Recently, it is proposed to impart flame retardancy to the resin composition without sacrificing heat resistance and impact resistance by the addition of a high molecular weight halogen-containing compound of the formula:

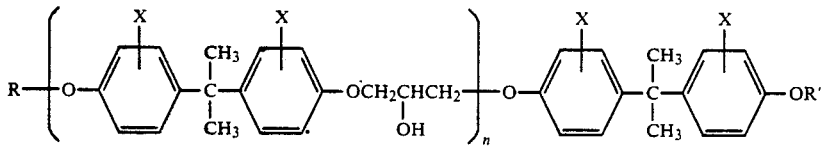

wherein X is a hydrogen atom, a Chlorine atom or a bromine atom and n is a number of 35 to 100 (see Japanese Patent Kokai Publication No. 22958/1989 ). However, the resin composition containing such high molecular weight compound has decreased processability and poor heat stability and is not a satisfactory material.

A material to be used in a machine which may used near a window such as a personal computer and a facsimile machine is required to have light resistance.

DETAILED DESCRIPTION OF THE INVENTION

As a result of the extensive study in view of the above problems, the present inventors have found that the addition of a halogen-containing compound having a specific chemical structure to a resin composition significantly improves heat stability and light stability without sacrificing good heat resistance and impact resistance which are characteristics of the resin composition and have completed the present invention.

Accordingly, the present invention provides a flame retardant resin composition comprising (A) 70 to 10% by weight of a rubber-reinforced styrene base resin, (B) 20 to 85% by weight of polycarbonate resin, (C) 5 to 35% by weight of a high molecular weight halogen-containing compound of the formula:

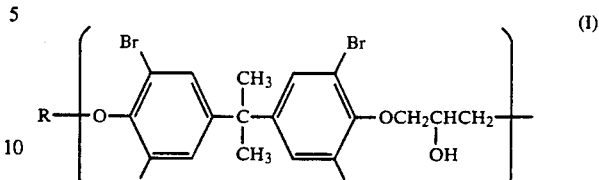

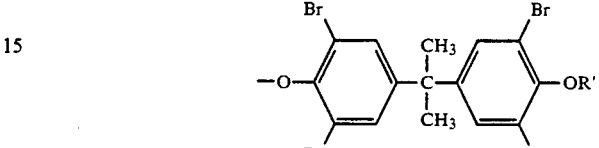

wherein n is an average polymerization degree and an integer of 4 to 30, R and R' are independently a hydrogen atom, a methyl group, an epoxypropyl group, a phenyl group, a halogenated phenyl group or a group of the formula:

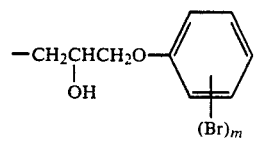

wherein m is an integer of 0 to 3, which compound has a bromine content of at least 45% by weight and an epoxy equivalent of at least 10,000 g/mol, and (D) 0 to 10% by weight of an antimony compound.

The flame retardant resin composition of the present invention will be explained in detail.

The rubber-reinforced styrene base resin (A) to be used in the present invention is a graft copolymer which is obtained by polymerizing an aromatic vinyl compound and optionally other copolymerizable vinyl compound in the presence of a rubber polymer, or a mixture of said graft copolymer and an aromatic vinyl polymer which is obtained by polymerizing an aromatic vinyl compound and optionally other copolymerizable vinyl compound.

Examples of the rubber polymer which constitutes the rubber-reinforced styrene base resin (A) are diene base rubbery polymers such as polybutadiene, butadiene-styrene copolymer and butadiene-acrylonitrile copolymer; and non-diene base rubbery polymers such as ethylene-propylene copolymer, ethylene-propylene-non-conjugated diene copolymer, acrylic rubber polymer and chlorinated polyethylene. They are used independently or as a mixture thereof. These rubbery polymers may be prepared by emulsion polymerization, solution polymerization, bulk polymerization or suspension polymerization.

When the rubbery polymer is prepared by emulsion polymerization, there is no limitation of its particle size and a gel content. Preferably, the average particle size is from 0.1 to 1 μm, and the gel content is from 0 to 95% by weight.

Examples of the aromatic vinyl compound are styrene, α-methylstyrene, o-methylstyrene, m-methylstyrene, p-ethylstyrene, tert.-butylstyrene, α-methylvinyltoluene, dimethylstyrene, chlorostyrene, dichlorostyrene, bromostyrene, dibromostyrene, and the like. They may be used independently or as a mixture thereof. In particular, styrene and α-methylstyrene are preferred.

Examples of the other vinyl compound copolymerized with the aromatic vinyl compound are cyanated vinyl compounds such as acrylonitrile, methacrylonitrile, etc.; alkyl esters of unsaturated carboxylic acids such as methyl acrylate, ethyl acrylate, butyl acrylate, 2-ethylhexyl acrylate, methyl methacrylate, ethyl methacrylate, propyl methacrylate, 2-ethylhexyl methacrylate, etc.; maleimide compounds such as maleimide, N-phenylmaleimide, N-methylmaleimide, N-cyclohexylmaleimide, etc. They may be used independently or as a mixture. In particular, acrylonitrile, methyl methacrylate and N-phenylmaleimide are preferred.

For graft polymerization, conventional emulsion polymerization, suspension polymerization, bulk polymerization, solution polymerization or a combination thereof is employed.

As the aromatic vinyl compound and the other copolymerizable vinyl compound which constitute the aromatic vinyl polymer to be used in combination with the graft copolymer, one or more compounds selected from the same group as those used in the preparation of the graft copolymer may be used. To polymerize the aromatic vinyl polymer, conventional emulsion polymerization, suspension polymerization, bulk polymerization or a combination thereof is employed.

There is no specific limitation on a ratio of the rubbery polymer to the compound in the rubber-reinforced styrene base resin (A). Preferably, 5 to 80% by weight of the rubbery polymer and 95 to 20% by weight of the compound are used. Also, there is no limitation of a ratio of the aromatic vinyl compound to the other vinyl compound. Preferably, 10 to 100% by weight, in particular 30 to 70% by weight of the aromatic vinyl compound and 90 to 0% by weight, in particular 70 to 30% by weight of the other vinyl compound are used.

Examples of the polycarbonate resin (B) which constitutes the flame retardant resin composition of the present invention are aromatic polycarbonates, aliphatic polycarbonates, aromatic aliphatic polycarbonates, and the like. In general, the polycarbonate resin (B) is a polymer or copolymer of a bisphenol such as 2,2-bis(4-hydroxyphenyl)alkanes, bis(4-hydroxyphenyl)ethers, bis(4-hydroxyphenyl)sulfone, sulfide or sulfoxide. Depending on the purpose, a polymer or copolymer comprising a bisphenol substituted with a halogen atom may be used.

There is no limitation on a molecular weight of the polycarbonate resin (B). Preferably, the polycarbonate resin has a viscosity average molecular weight of 10,000 to 100,000. Also, a preparation method is not limited, and a phosgene process or transesterification may be used.

The high molecular weight halogen-containing compound (C) is a compound of the formula:

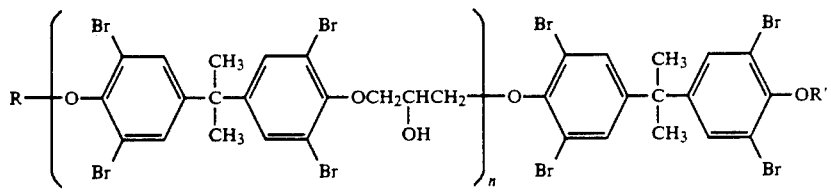

The average polymerization degree "n" is from 4 to 30. When it is less than 4, the final composition has poor impact resistance, heat resistance and heat stability. When it exceeds 30, the processability is deteriorated. In view of the balance among impact resistance, heat resistance, heat stability and processability, the average polymerization degree is preferably from 6 to 25, in particular from 10 to 25.

R and R' are each a hydrogen atom, a methyl group, an epoxypropyl group, a phenyl group, a halogenated phenyl group or a group of the formula:

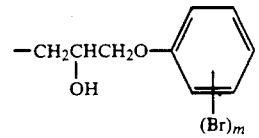

in which m is a number of 0 to 3. In view of heat stability and flame retardancy of the final composition, preferably both R and R' are the halogenated phenyl groups, in particular tribromophenyl groups.

The content of bromine atoms is at least 45% by weight. When the bromine content is less than 45% by weight, the final composition has poor flame retardance. Preferably, the bromine content is at least 50% by weight.

Further, the epoxy equivalent is at least 10,000 g/mol. When the epoxy equivalent is less than this value, the final composition has poor heat stability. In particular, the epoxy equivalent of at least 20,000 g/mol but less than 100,000 g/mol is preferred.

There is no limitation on a softening point of the high molecular halogen-containing compound (C). In view of impact resistance and heat resistance, one having a softening point of 180° to 210° C. is preferred.

As a process for preparing the high molecular weight halogen-containing compound (C), the following process is exemplified:

A bromobisphenol A type epoxy resin and bromophenol, preferably tribromophenol are heated and reacted in the presence of a base catalyst such as lithium hydroxide. By this reaction, is produced the high molecular weight halogen-containing compound in which many of the terminal epoxy groups of the epoxy resin are replaced with bromophenol and the rest of the terminal epoxy groups remain unchanged.

Examples of the antimony compound (D) to be used in the present invention are antimony trioxide, antimony petoxide, etc. They may be used independently or as a mixture thereof.

The antimony compound (D) is used in combination with the high molecular weight halogen-containing compound. This combination shows less plate-out and has better light resistance than a combination of the antimony compound and a conventional flame retarder (e.g. tetrabromobisphenol A or decabromodiphenyl ether).

The flame retardant resin composition of the present invention comprises 70 to 10% by weight of the rubber-reinforced styrene base resin (A), 20 to 85% by weight of the polycarbonate resin (B), 5 to 35% by weight of the high molecular weight halogen-containing compound (C) and 0 to 10% by weight of the antimony compound. Outside these ranges, it is impossible to provide a composition having intended properties. In view of impact resistance, heat resistance, processability, heat stability, flame retardance and light resistance, preferably the composition comprises 65 to 12% by weight of (A), 25 to 80% by weight of (B), 8 to 25% by weight of (C) and 0 to 5% by weight of (D).

An order and method for compounding the above components are not limited. Not only all the components are mixed simultaneously, but also specific components are premixed and then the rest of the components are mixed with the premix. Any of conventional mixing means such as a Banbury mixer, rolls, an extruder and the like can be used.

During compounding, if desired, an antistatic agent, a lubricant, a dye or pigment, a plasticizer, a mold release agent, a filler and the like may be added.

The present invention will be illustrated by Examples and Comparative Examples, in which parts and % are by weight.

Reference Example 1 (ABS Resin 1)

A rubber-reinforced styrene base resin having a rubber content of 20% (ABS Resin 1) was prepared from a graft polymer which was produced by emulsion graft polymerizing 50 parts of polybutadiene, 35 parts of styrene and 15 parts of acrylonitrile in a conventional manner and a copolymer which was produced by suspension polymerizing 75 parts of styrene and 25 parts of acrylonitrile in a conventional manner.

Reference Example 2 (ABS Resin 2)

A rubber-reinforced styrene base resin having a rubber content of 15% (ABS Resin 2) was prepared from the graft polymer used in ABS Resin 1 and a copolymer which was prepared by emulsion polymerizing 75 parts of α-methylstyrene and 25 parts of acrylonitrile in a conventional manner.

Reference Example 3 (PC)

By the phosgene method, was prepared a polycarbonate of the following formula having a viscosity average molecular weight of 22,000:

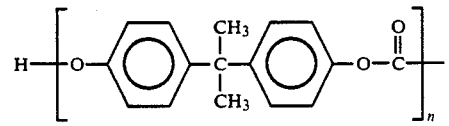

Reference Examples 4–12

A bromobisphenol A type epoxy resin and tribromophenol were reacted at 200° C. in the presence of lithium hydroxide. By changing the reaction conditions, eight high molecular weight halogen-containing compounds having different average polymerization degrees, bromine contents or epoxy equivalents (C-1 to C-4 and X-1 to X-4) were prepared.

Reference Example 13

As the antimony compound, a commercially available antimony trioxide ($Ab_2O_3$) was used.

Examples and Comparative Examples

The rubber-reinforced styrene base resin (ABS Resin), the polycarbonate resin and the high molecular weight halogen-containing compound (or a conventional flame retarder) were kneaded in a formulation shown in Tables 1, 2 or 3 to obtain a resin composition.

The properties of the resulting compositions are shown in Tables 1, 2 and 3.

TABLE 1

| Example No. | 1 | 2 | 3 | C. 1 | C. 2 | C. 3 |
|---|---|---|---|---|---|---|
| Formulation (%) | | | | | | |
| (A) ABS-1 | 40 | 40 | 40 | 40 | 40 | 40 |
| (B) PC | 40 | 40 | 40 | 40 | 40 | 40 |
| (C) High Mol. Wt. halogen-cont. compound | 16 | 16 | 16 | 16 | 16 | 16 |
| Kind: | C-1 | C-2 | C-3 | X-1 | X-2 | X-3 |
| Structures: | | | | | | |
| 1) Av. Polymerization degree | 5 | 15 | 30 | 2 | 5 | 30 |
| 2) Br content | 54 | 53 | 53 | 57 | 54 | 53 |
| 3) Epoxy Eq. | 30000 | 90000 | 90000 | 11000 | 3000 | 9000 |
| 4) Softening point | 154 | 183 | 205 | 100 | 160 | 210 |
| (D) $Sb_2O_3$ | 4 | 4 | 4 | 4 | 4 | 4 |
| Properties | | | | | | |
| -Notched Izod impact strength (¼ inch, 23° C.) (kg·cm/cm) | 25 | 26 | 27 | 15 | 22 | 24 |
| -Thermal deformation temperature (1.4 inch, 264 psi) (°C.) | 101 | 104 | 105 | 96 | 101 | 104 |

TABLE 1-continued

| Example No. | 1 | 2 | 3 | C. 1 | C. 2 | C. 3 |
|---|---|---|---|---|---|---|
| -Flowability 220° C., 10 kg/cm² (g/10 min.) | 15 | 8 | 5 | 20 | 14 | 8 |
| -Flammability UL- 94, ⅛ inch | V-0 | V-0 | V-0 | V-0 | V-0 | V-0 |
| -Heat stability[1] | ○ | ○ | ○ | X | X | X |
| -Light resistance[2] | 3.0 | 2.5 | 2.0 | 5.0 | 3.0 | 1.5 |

[1] After retaining the composition in an injection molding machine at 240° C. for 30 minutes, a test piece is molded. A color tone and gloss of the test piece are compared with those of an unretained product.
○: No change. X: Changed.
[2] Exposing the composition by the Sunshine Weather-O-meter for 100 hours, a color is measured and color difference with an unexposed composition is determined.

TABLE 2

| Example No. | C. 4 | C. 5 | C. 6 | 4 | 5 | C. 7 |
|---|---|---|---|---|---|---|
| Formulation (%) | | | | | | |
| (A) ABS-1 | 40 | 40 | 40 | 18 | 80 | 10 |
| (B) PC | 40 | 40 | 40 | 60 | 10 | 80 |
| (C) High Mol. Wt. halogen-cont. compound | 16 | 16 | 16 | 17 | 10 | 16 |
| Kind: | X-1 | DBDE* | TBA** | C-2 | C-4 | C-2 |
| Structures: | | | | | | |
| 1) Av. Polymerization degree | 50 | — | — | 15 | 20 | 15 |
| 2) Br content | 54 | — | — | 53 | 54 | 53 |
| 3) Epoxy Eq. | 30000 | — | — | 90000 | 60000 | 90000 |
| 4) Softening point | >220 | — | — | 183 | 195 | 183 |
| (D) Sb₂O₃ | 4 | 4 | 4 | 5 | 0 | 4 |
| Properties | | | | | | |
| -Notched Izod impact strength (⅛ inch, 23° C.) (kg.cm/cm) | 25 | 13 | 10 | 20 | 28 | 10 |
| -Thermal deformation temperature (1.4 inch, 264 psi) (°C.) | 104 | 98 | 93 | 102 | 108 | 95 |
| -Flowability 220° C., 10 kg/cm² (g/10 min.) | 2 | 10 | 25 | 10 | 5 | 10 |
| -Flammability UL- 94, ⅛ inch | V-0 | V-0 | V-0 | V-0 | V-0 | V-0 |
| -Heat stability[1] | ○ | X | X | ○ | ○ | ○ |
| -Light resistance[2] | 1.0 | 20 | 15 | 1.5 | 4.0 | 1.0 |

*Decabromodiphenyl ether.
**Tetrabromobisphenol A.

TABLE 3

| Example No. | 6 | C. 8 | 7 |
|---|---|---|---|
| Formulation (%) | | | |
| (A) ABS-2 | 30 | 30 | 30 |
| (B) PC | 50 | 50 | 29 |
| (C) High Mol. Wt. halogen-cont. compound | 16 | 16 | 16 |
| Kind: | C-2 | X-2 | C-4 |
| Structures: | | | |
| 1) Av. Polymerization degree | 15 | 5 | 20 |
| 2) Br content | 53 | 54 | 54 |
| 3) Epoxy Eq. | 90000 | 3000 | 60000 |
| 4) Softening point | 183 | 160 | 195 |
| (D) Sb₂O₃ | 4 | 4 | 3 |
| Properties | | | |
| -Notched Izod impact strength (⅛ inch, 23° C.) (kg.cm/cm) | 18 | 10 | 20 |
| -Thermal deformation temperature (1.4 inch, 264 psi) (°C.) | 110 | 106 | 113 |
| -Flowability 220° C., 10 kg/cm² (g/10 min.) | 4 | 6 | 5 |
| -Flammability UL- 94, ⅛ inch | V-0 | V-0 | V-0 |
| -Heat stability[1] | ○ | X | ○ |
| -Light resistance[2] | 3.0 | 4.0 | 4.0 |

What is claimed is:

1. A flame retardant resin composition comprising (A) 70 to 10% by weight of a rubber-reinforced styrene base resin, (B) 20 to 85% by weight of a polycarbonate resin, (C) 5 to 35% by weight of a high molecular weight halogen-containing compound of the formula:

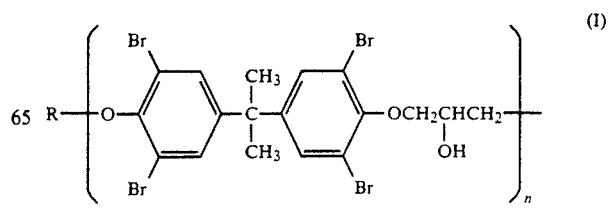

-continued

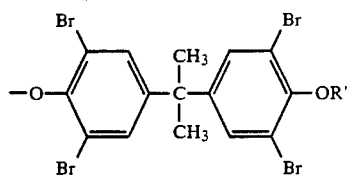

wherein n is an average polymerization degree and an integer of 4 to 30, R and R' are independently a hydrogen atom, a methyl group, an epoxypropyl group, a phenyl group, a halo-generated phenyl group or a group of the formula:

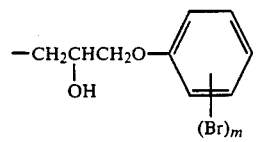

wherein m is an integer of 0 to 3, which compound has a bromine content of at least 45% by weight and an epoxy equivalent of at least 20,000 g/mol but less than 100,000 g/mol and (D) 0 to 10% by weight of an antimony compound.

* * * * *

UNITED STATES PATENT AND TRADEMARK OFFICE
CERTIFICATE OF CORRECTION

PATENT NO. : 5,250,590
DATED : October 5, 1993
INVENTOR(S) : FUMIO NAKAI ET AL

It is certified that error appears in the above-indentified patent and that said Letters Patent is hereby corrected as shown below:

Column 10 claim 1, line 19, "halo-generated" should read —halogenated—

Signed and Sealed this

Twenty-third Day of August, 1994

Attest:

BRUCE LEHMAN

Attesting Officer

Commissioner of Patents and Trademarks